(12) United States Patent
Cummins

(10) Patent No.: US 6,430,942 B1
(45) Date of Patent: Aug. 13, 2002

(54) INHIBITOR REPLENISHMENT SYSTEM

(75) Inventor: Charles G. Cummins, Canastota, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/703,116

(22) Filed: Oct. 31, 2000

(51) Int. Cl.⁷ .............................................. F25B 15/00
(52) U.S. Cl. .......................................... 62/112; 62/476
(58) Field of Search .................................. 62/476, 112

(56) References Cited

U.S. PATENT DOCUMENTS

| | | | | |
|---|---|---|---|---|
| 5,186,009 A | * | 2/1993 | Rockerfeller | 62/112 |
| 5,653,117 A | * | 8/1997 | Kujak | 62/112 |
| 5,783,104 A | * | 7/1998 | Kujak | 252/69 |
| 5,811,026 A | * | 9/1998 | Phillips et al. | 252/74 |
| 5,846,450 A | * | 12/1998 | Atkinson | 252/69 |
| 6,004,475 A | * | 12/1999 | Verma et al. | 252/69 |
| 6,033,595 A | * | 3/2000 | Verma et al. | 252/69 |
| 6,083,416 A | * | 7/2000 | Verma et al. | 252/69 |
| 6,177,025 B1 | * | 1/2001 | Ring et al. | 252/69 |
| 6,267,908 B1 | * | 7/2001 | Verma et al. | 252/69 |
| 6,279,342 B1 | * | 8/2001 | Mabuchi et al. | 62/476 |

* cited by examiner

*Primary Examiner*—William C. Doerrler
*Assistant Examiner*—Mark Shulman
(74) *Attorney, Agent, or Firm*—Wall Marjama & Bilinski LLP

(57) ABSTRACT

An on line corrosion replenishment system for use in an absorption cooling unit which includes an evaporator means, an absorber means, a generator means and a condenser means which are interconnected to provide an absorption cycle in which a lithium bromide solution is circulated through said unit through a series of interconnected flow lines and pumps. A source of time release corrosion inhibitor is connected to one of said flow lines to selectively release corrosion inhibitor to the lithium bromide solution.

10 Claims, 2 Drawing Sheets

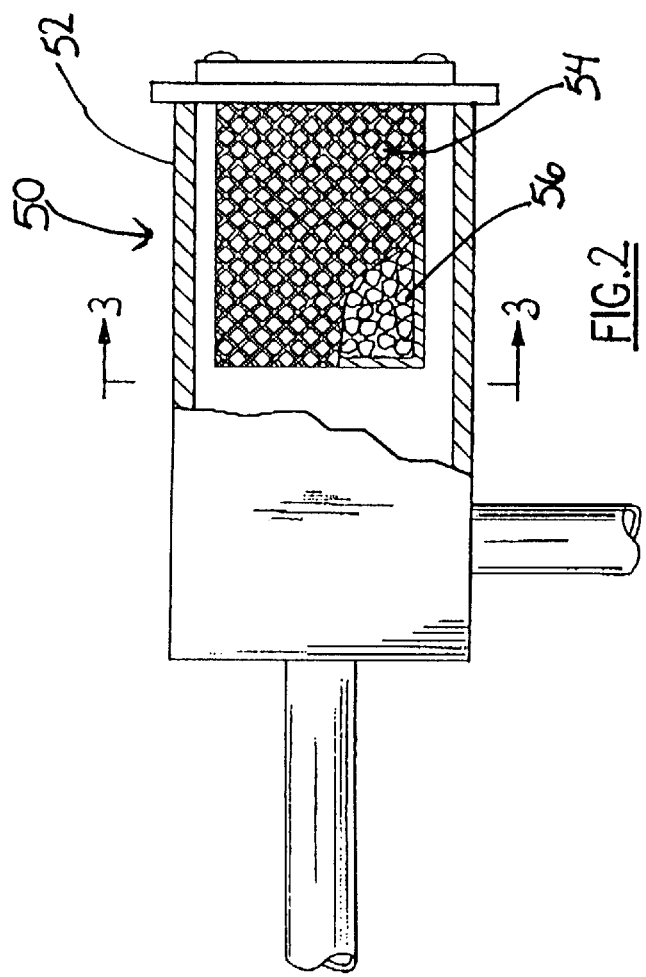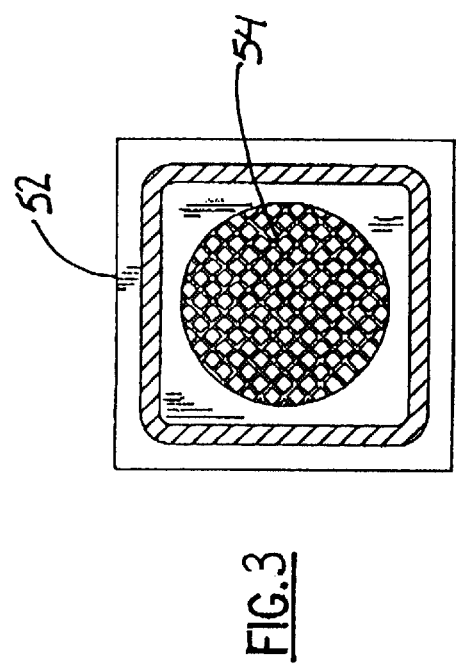

INHIBITOR REPLENISHMENT SYSTEM

BACKGROUND OF THE INVENTION

This invention relates generally to absorption refrigeration systems and more particularly to corrosion inhibiting materials for use in such systems and to a method of providing such materials to an absorption system. Corrosion inhibitors are commonly provided to an absorption system to reduce the corrosion of metals in the system that are in contact with the system working fluid.

There are a number of different pairs of refrigerants and absorbents that are used in absorption refrigeration systems. One such pair is water and a halogen salt of lithium, such as lithium bromide, lithium chloride or lithium iodide, mixed to form a concentrated aqueous solution of the lithium salt. Another such pair is water and ammonia.

Iron and iron alloys like steel and copper and copper alloys are typical construction materials used in absorption refrigeration systems. The corrosion of these metals can cause difficulties and in some cases, if unchecked, can shorten the life of the chiller interior components. Not only is metal loss of concern, but also the oxidation of ferrous metal produces gaseous hydrogen. If not purged, the hydrogen can interfere with the proper operation of the system. Corrosion is of particular concern in systems that use halogen salts of lithium, and regardless of the refrigerant/absorbent pair used in a particular system, metal corrosion rates increase as system temperatures increase.

It is well known in the prior art that the addition of a salt of chromium, such as lithium chromate, to the refrigerant/absorbent solution in an absorption refrigeration system, is effective in reducing metallic corrosion. The presence of the chromate compound promotes the formation of a protective layer of iron and chromium oxides on the surfaces of the system that are in contact with the absorbent. With a reduction in iron oxidation, there is also a corresponding reduction in the production of noncondensible hydrogen. There is some concern, however, about the health risks that chromium presents. At least one government authority, the U.S. Environmental Protection Agency, has identified chromium as a carcinogen, and has prohibited the presence of chromium compounds in systems that are open to the atmosphere. As of this writing, there is no restriction on the use of chromium compounds in closed systems but there may be such a restriction in the near future. Absorption refrigeration systems are, of course, closed systems, but a certain amount of working fluid from the system can become exposed to the atmosphere through the taking of samples, the manufacturing process and spills during handling and filing. And, at the end of the service life of a system, the system charge will necessarily require disposal of the working fluid, including the chromium compounds that it contains.

Currently available is a chromium-free aqueous solution of either a halogen salt of lithium or ammonia for use as a working fluid in a absorption refrigeration system. In addition to the lithium salt or ammonia, the solution also typically contains a compound containing a molybdate, a compound containing a borate and, in a preferred embodiment, a compound containing a silicate, so that ions of molybdenum, boron and silicon are present in the working fluid. A sufficient quantity of a compound containing a hydroxide is added to the solution to render it rather strongly basic. The added constituents act as effective corrosion inhibitors. The inhibiting performance of these fluids is superior to that of the prior lithium chromate inhibitors.

A working fluid is prepared by adding halogen or ammonium salts of molybdenum, boron and, in a preferred embodiment, silicon to the aqueous solution of the lithium salt or ammonia. A hydroxide of sodium, lithium, potassium or ammonium is also added to attain the desired alkalinity. The added compound are preferably added as aqueous solutions. This system is more fully described in U.S. Pat. No. 5,547,600 which is incorporated herein by reference.

Experience has indicated that new absorption chillers have a high inhibitor depletion rate which is predictable during its early hours of run time. A chiller operating with lower than recommended corrosion inhibitor concentration levels exposes the chiller interior to unacceptable corrosion rates and probable early life cycle failure. To provide ideal chiller corrosion protection, this rapid depletion of the initial inhibitor charge requires close observation of inhibitor concentration by solution sampling and timely replenishment by a skilled machine operator or service technician to maintain the desired inhibitor corrosion protection. This required personal attention is both costly and commonly leads to problems such a damaging corrosion rate due to mistakes in solution sampling and untimely inhibitor additions to the system.

It is therefore an object of the present invention to provide a corrosion replenishment system for an absorption refrigeration system which overcomes the problems of the prior art described above.

It is another object of the present invention to provide a corrosion inhibitor replenishment system which automatically provides corrosion protection for an absorption chiller.

It is a further object, of the present invention to provide a corrosion inhibitor system which is incorporated into the refrigerant flow during the operation of an absorption chiller.

It is yet another object of the present invention to provide at periodic time intervals an automatic time release process for supplying a corrosion inhibitor to an absorption chiller.

SUMMARY OF THE INVENTION

The present invention provides a system for unattended inhibitor periodic replenishment after selected numbers of hours of chiller operation. This is accomplished by using a coating to encapsulate the inhibitor which may be in pellet, granular, tablet, capsule or block form. The inhibitor coating will break down over specified periods of time when exposed to the absorption chiller refrigerant (water) thus allowing the inhibitor to be released into the refrigerant. This process is similar to that employed in the time release of certain medications and fertilizers which are released at predetermined time intervals, and spot preventing agents for dishwashers. At a selected location, the inhibitor would only be exposed to the refrigerant when the chiller is running. This would link the time encapsulated inhibitor is exposed to refrigerant to chiller run time. Optionally, the introduction of the inhibitor at the refrigerant spray header, would promote mixing as the refrigerant is circulated through the spray nozzles and refrigerant pump. The chiller electronic controls can be programmed to trigger a dilution cycle event at prescribed numbers of run time hours to allow the inhibitor rich refrigerant to mix with the LiBr solution in the absorber, and be circulated by the solution pump to the remainder of the chiller. This completes a cycle of unattended inhibitor replenishment on a timely basis to maintain the integrity of the corrosion protected surfaces of the complete chiller interior.

BRIEF DESCRIPTION OF THE DRAWINGS

For a fuller understanding of the nature and objects of the invention, reference should be made to the following detailed description of a preferred mode of practicing the invention, read in connection with the accompanying drawings, in which:

FIG. 2 is an enlarged side view of a canister which holds the corrosion inhibiting material.

FIG. 3 is a view of the canister of FIG. 2 taken along line 3—3.

DETAILED DESCRIPTION OF THE INVENTION

Figure 1:
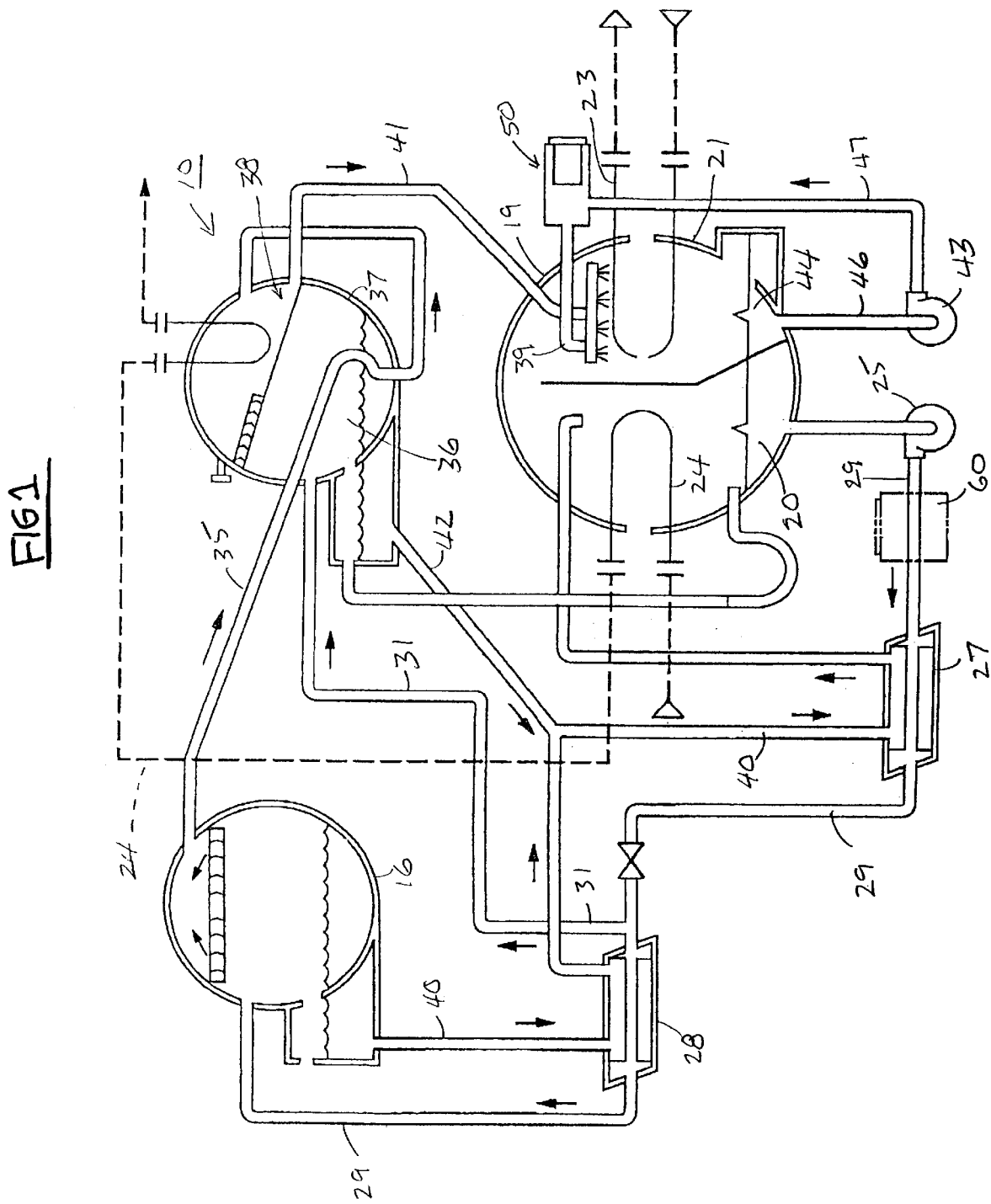
FIG. 1 is a schematic drawing illustrating the key component parts of an absorption system.

Turning now to FIG. 1, there is illustrated in schematic form the basic component parts of the absorption system 10 embodied within the machine illustrated in FIG. 1. The operation of the cycle will be described in regard to the machine running in a cooling mode, however, it should be evident to one skilled in the art that the cycle can be adjusted so that the machine can also operate in a heating mode. The present system employs water as a refrigerant and lithium bromide, which has a high affinity for water, as an absorbent.

The machine includes an evaporator 19 and an absorber 20 mounted in a side-by-side relationship within a common shell 21. Liquid refrigerant used in the process is vaporized in the evaporator where it absorbs heat from a substance that is being chilled. The substance being chilled is brought through the evaporator by a line 23. Vaporized refrigerant developed in the evaporator is passed to the absorber where it is combined with an absorbent to create a solution suitable for use in the process. Heat developed in the absorption process is taken out of the absorber by means of a water line 24.

Upon leaving the low temperature solution heat exchanger 27, a portion of the weak solution is sent to the low temperature generator 36 via low temperature solution line 31. The remaining weak solution is sent through the high temperature solution heat exchanger 28 on to the high temperature generator 16 via solution line 29. Although not shown in FIG. 1, the weak solution in the high temperature generator is increased in temperature by an external heat source to vaporize the refrigerant and thus, remove it from the solution. The refrigerant vapor that is boiled away is passed by means of vapor line 35 into the low temperature generator 36 which is housed in shell 37 along with the system condenser 38. Here, the remainder of the weak solution is heated and refrigerant contained therein is vaporized by the high temperature refrigerant and delivered, along with the high temperature generator vapor, condensate into the system condenser. In the condenser, the refrigerant vapors are placed in heat transfer relationship with the cooling water passing through line 24 to place refrigerant in a subcooled liquid state. Strong absorbent solution flows from the two generators back to the absorber to be reused in the absorption cycle. On its return, the strong solution from the high temperature generator is passed through the high temperature solution heat exchanger 28 and then through the second low temperature solution heat exchanger 27 via solution return line 40. Strong solution leaving the low temperature generator is connected into the solution return line by means of a feeder line 42 which enters the return line at the entrance of the second solution heat exchanger.

The condensed liquid refrigerant from the condenser is gravity fed by line 41 to the evaporator sump.

A refrigerant pump 43 is connected to the sump 44 of the system evaporator by a suction line 46 and is arranged to pump liquid refrigerant collected in the sump back to the spray header 39 via supply line 47.

According to the present invention, a canister 50 located in the refrigerant flow supply line 47 upstream of spray header 39, and functions to supply inhibitor to the system. The canister contains an outer housing 52 and an internal mesh basket 54 containing encapsulated inhibitor which allows the refrigerant to flow through the canister and cause the inhibitor to be dissolved and mixed in the refrigerant flow and released through the spray header 39. As illustrated in FIG. 2, the inhibitor is in the form of granules 56. In an alternative embodiment, the canister may be connected to flow line 29 as illustrated at 60 in FIG. 1, and functions in the same manner as described above for canister 50. In the present invention, molybdenum in the form of a molybdate, such as lithium molybdate, is preferably used as the corrosion inhibitor.

The working fluid for the absorption unit should have a normality of from 0.03 to 0.2, molybdenum concentrations in the range of 120 to 180 ppm, boron concentrations in the range of 160 to 220 ppm and silicon concentrations in the range of 1 to 20 ppm. Furthermore, relatively small concentrations of inhibitor additives, from about 10 ppm of molybdenum and 1 ppm of boron, should be effective in reducing corrosion. These additives are more fully described in the previously identified U.S. Pat. No. 5,547,600. The time release is accomplished by conventional techniques well known in the art. The solid inhibitor, i.e., lithium molybdate in the form of granules or pellets are coated with a permeable or solid coating that permits slow and uniform release of the molybdate into solution. Suitable coating materials include silica gels, silicates, and gelatin and related gels.

While the present invention has been particularly shown and described with reference to the preferred mode as illustrated in the drawing, it will be understood by one skilled in the art that various changes in detail may be affected therein without departing from the spirit and scope of the invention as defined by the claims.

We claim:

1. An on line corrosion replenishment system for use in an absorption cooling unit which includes an evaporator means, an absorber means, a generator means and a condenser means which are connected through a series of interconnected flow lines and pumps, to provide an absorption cycle in which a lithium bromide solution is circulated through said unit, the improvement comprising positioning a source of time release molybdate corrosion inhibitor material by connection to one of said flow lines to selectively release said corrosion inhibitor material to said solution while said unit is in operation.

2. The system of claim 1 in which said source of time release inhibitor is connected to the refrigerant flow supply line.

3. The system of claim 2 in which said inhibitor flows through an evaporator spray header.

4. The system of claim 1 in which the molybdate is lithium molybdate.

5. The system of claim 4 in which the released lithium molybdate is present in a concentration of about 120 to 180 ppm of the lithium bromide solution.

6. An on line corrosion replenishment system for use in an absorption cooling unit which includes an evaporator means, an absorber means, a generator means and a condenser means which are interconnected to provide an absorption cycle in which a lithium bromide solution is circulated through said unit through a series of interconnected flow lines and pumps, said system further including a source of corrosion inhibitor connected to one of said flow lines to selectively release corrosion inhibitor material to said solution while said unit is in operation.

7. The system of claim 1 in which the source of corrosion inhibitor is in the form of a container which is connected on line to the refrigerant flow supply line for release of inhibitor to the system through the evaporator spray header.

8. The system of claim 6 in which the corrosion inhibitor comprises a molybdate.

9. The system of claim 6 in which the molybdate is lithium molybdate.

10. The system of claim 6 in which the released lithium molybdate is present in a concentration of about 120 to 180 ppm of the lithium bromide solution.

* * * * *